United States Patent
Nishi et al.

(10) Patent No.: US 12,018,692 B2
(45) Date of Patent: Jun. 25, 2024

(54) MOTOR DRIVE CONTROL DEVICE AND FAN UNIT

(71) Applicant: MINEBEA MITSUMI Inc., Nagano (JP)

(72) Inventors: Shuhei Nishi, Nagano (JP); Kimihiro Hayashi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/355,740

(22) Filed: Jun. 23, 2021

(65) Prior Publication Data

US 2021/0404478 A1 Dec. 30, 2021

(30) Foreign Application Priority Data

Jun. 29, 2020 (JP) ................................. 2020-111699

(51) Int. Cl.
*F04D 27/00* (2006.01)
*F04D 25/06* (2006.01)
*F04D 29/32* (2006.01)

(52) U.S. Cl.
CPC ........... *F04D 27/004* (2013.01); *F04D 25/06* (2013.01); *F04D 29/325* (2013.01)

(58) Field of Classification Search
CPC .... F04D 19/0021; F04D 25/06; F04D 27/004; F04D 27/007; F04D 29/325; F04D 15/0066; H02P 21/18; H02P 21/20
USPC ........................................ 318/400.02, 400.15
See application file for complete search history.

(56) References Cited

U.S. PATENT DOCUMENTS

| 8,297,068 B2 | 10/2012 | Yokouchi et al. |
| 9,631,830 B2 | 4/2017 | Sasaki |
| 2010/0123418 A1* | 5/2010 | Itoh ..................... H02P 21/0089 318/400.15 |

(Continued)

FOREIGN PATENT DOCUMENTS

| AU | 2018425573 B2 | 12/2019 |
| EP | 3 806 320 A1 | 4/2021 |

(Continued)

OTHER PUBLICATIONS

First Office Action dated Jan. 30, 2024 in the corresponding Japanese Application No. 2020-111699 and English translation.

*Primary Examiner* — Philip E Stimpert
(74) *Attorney, Agent, or Firm* — Pearne & Gordon LLP (57) ABSTRACT

A motor drive control device includes a control circuit to output a drive control signal for controlling the drive of a motor of a fan and a motor drive circuit to drive the motor, based on the drive control signal. The control circuit includes a storage unit to store correspondence information indicating a relationship between rotation speed and torque of the motor when the fan supplies a predetermined air volume, a target torque determination unit to determine a target torque from the rotation speed using the correspondence information corresponding to a specified target air volume, a target rotation speed determination unit to determine a target rotation speed such that a difference between the target torque and a torque value of the motor is reduced, and a drive control signal generation unit to generate the drive control signal such that the rotation speed of the motor approaches the target rotation speed.

4 Claims, 5 Drawing Sheets

(56) References Cited

U.S. PATENT DOCUMENTS

| | | | |
|---|---|---|---|
| 2014/0091622 A1* | 4/2014 | Lucas | H02J 3/381 |
| | | | 318/400.04 |
| 2020/0217548 A1* | 7/2020 | Yang | F04D 15/0066 |
| 2021/0218355 A1 | 7/2021 | Hotta et al. | |

FOREIGN PATENT DOCUMENTS

| | | | |
|---|---|---|---|
| JP | 3738685 B2 | | 1/2006 |
| JP | 2011-234452 A | | 11/2011 |
| JP | 5327045 B2 | | 10/2013 |
| JP | 6037316 B2 | | 12/2016 |
| KR | 930017275 A | * | 8/1993 |
| WO | 2019/229885 A1 | | 12/2019 |

* cited by examiner

MOTOR DRIVE CONTROL DEVICE AND FAN UNIT

CROSS-REFERENCE TO RELATED APPLICATIONS

This application claims the benefit of Japanese Application No. 2020-111699 filed on Jun. 29, 2020, the entire disclosure of which is hereby incorporated herein by reference.

TECHNICAL FIELD

The present invention relates to a motor drive control device and a fan unit.

BACKGROUND ART

In ventilation fans and the like, it is known that the amount of air blown by the fan changes when a pressure loss (static pressure) and the like changes depending on a duct length and a state of inner and outer parts of a duct. Therefore, in motor drive control devices driving a motor of a fan such as a ventilation fan, there is a demand for a function of controlling the motor so that the amount of air blown by the fan is constant, even when the static pressure or the like changes.

Conventional techniques for controlling the air volume of a fan so that the air volume is constant are disclosed in Patent Literature 1 to 3, for example. Specifically, Patent Literature 1 discloses a technique for maintaining a constant air volume of a fan by correcting the rotation speed of a motor by using a predetermined air volume value and a torque value of the motor. Furthermore, Patent Literature 2 discloses a technique for maintaining a constant air volume of a fan by controlling the number of rotations of a motor, based on a current value of the motor detected by utilizing a correlation between the air volume during one rotation of the motor and the current of the motor. Moreover, Patent Literature 3 discloses a technique for maintaining a constant air volume of a fan by calculating a torque command value by using a polynomial expression of a variable obtained by dividing a target value of the air volume of the fan by the rotation speed of a motor.

CITATION LIST

Patent Literature

Patent Literature 1: JP 5327045 B
Patent Literature 2: JP 3738685 B
Patent Literature 3: JP 6037316 B

SUMMARY OF INVENTION

Technical Problem

According to the conventional technology described above, it is possible to control the air volume of a fan so that the air volume is constant. However, the inventors of the present application have conceived that, if it is possible to achieve control for maintaining the air volume of a fan constant by a simpler configuration and calculation than those in the conventional technology, the cost of parts such as a microcontroller constituting a motor drive control device is reduced and a cheaper fan can be provided.

The present invention has been contrived to solve the problems mentioned above, and an object of the present invention is to control the air volume of a fan so that the air volume is constant, by a simple configuration and calculation.

Solution to Problem

A motor drive control device according to a typical embodiment of the present invention includes a control circuit configured to output a drive control signal for controlling drive of a motor of a fan and a motor drive circuit configured to drive the motor, based on the drive control signal output from the control circuit, and the control circuit includes a storage unit configured to store correspondence information indicating a relationship between a rotation speed and a torque of the motor when the fan supplies a predetermined air volume, a target torque determination unit configured to determine a target torque from the rotation speed of the motor by using the correspondence information corresponding to a specified target air volume, a torque acquisition unit configured to acquire a torque value of the motor, a target rotation speed determination unit configured to determine a target rotation speed of the motor, the target rotation speed being a speed determined such that a difference between the target torque and the torque value acquired by the torque acquisition unit is reduced, and a drive control signal generation unit configured to generate the drive control signal such that the rotation speed of the motor approaches the target rotation speed.

Advantageous Effects of Invention

According to one aspect of the present invention, the air volume of a fan can be controlled so that the air volume is constant, by a simple configuration and calculation.

DESCRIPTION OF EMBODIMENTS

1. Overview of Embodiment

First, an overview of a typical embodiment of the invention disclosed in the present application will be described. Note that, in the following description, reference numerals in the drawings corresponding to the constitution elements of the invention are mentioned in parentheses as an example.

[1] A motor drive control device (1) according to a typical embodiment of the present invention includes a control circuit (3) configured to output a drive control signal (Sd) for controlling the drive of a motor (20) of a fan (22) and a motor drive circuit (2) configured to drive the motor, based on the drive control signal output from the control circuit.

The control circuit includes a storage unit (31) configured to store correspondence information (310_1 to 310_n) indicating a relationship between a rotation speed and a torque of the motor when the fan supplies a predetermined air volume, a target torque determination unit (30) configured to determine a target torque from the rotation speed of the motor by using the correspondence information corresponding to a specified target air volume, a torque acquisition unit (32) configured to acquire a torque value (Ts) of the motor, a target rotation speed determination unit (34) configured to determine a target rotation speed (EXC) of the motor, the target rotation speed being a speed determined such that a difference (ΔT) between the target torque and the torque value acquired by the torque acquisition unit is reduced, and a drive control signal generation unit (35) configured to generate the drive control signal such that the rotation speed of the motor approaches the target rotation speed.

[2] In the motor drive control device described above in [1], the correspondence information may include a function (310_1 to 310_n) expressing the relationship between the rotation speed and the torque of the motor, and the storage unit may store the function for each of command values for a plurality of air volumes specifiable in the fan.

[3] In the motor drive control device described above in [1] or [2], the motor may include coils in three phases, the drive control signal generation unit may be configured to calculate, based on a current flowing in the coil of each phase of the motor, a q-axis current (Iq) corresponding to the torque of the motor and a d-axis current (Id) corresponding to a magnetic flux of the motor, determine a duty ratio such that the calculated q-axis current and the calculated d-axis current are respectively equal to target current values (Iq_req and Id_ref) corresponding to the target rotation speed, and output a PWM signal having the duty ratio, as the drive control signal, and the torque acquisition unit may be configured to acquire the torque value (Ts), based on the q-axis current calculated by the drive control signal generation unit.

[4] In the motor drive control device described above in any one of [1] to [3], the target rotation speed determination unit may be configured to perform a PI control calculation to reduce the difference between the target torque and the torque value and multiply a control amount obtained from the PI control calculation by a predetermined coefficient to calculate the target rotation speed.

[5] A fan unit (100) according to a typical embodiment of the present invention includes the motor drive control device (1) described above in any one of [1] to [4], the motor (20) configured to be driven by the motor drive control device, and an impeller (21) configured to be rotatable by a rotation force of the motor.

2. Specific Examples of Embodiment

Below, specific examples of the embodiment of the present invention will be described with reference to the drawings. Note that, in the following description, constitution elements common to each of the embodiments are denoted with the same reference numerals and will not be described repeatedly. Furthermore, it should also be noted that the drawings are schematic drawings and the dimensional relationships, the proportions, and the like between elements in the drawings may differ from reality. Among drawings, the dimensional relationships and proportions may not necessarily be the same.

Embodiments

Figure 1:
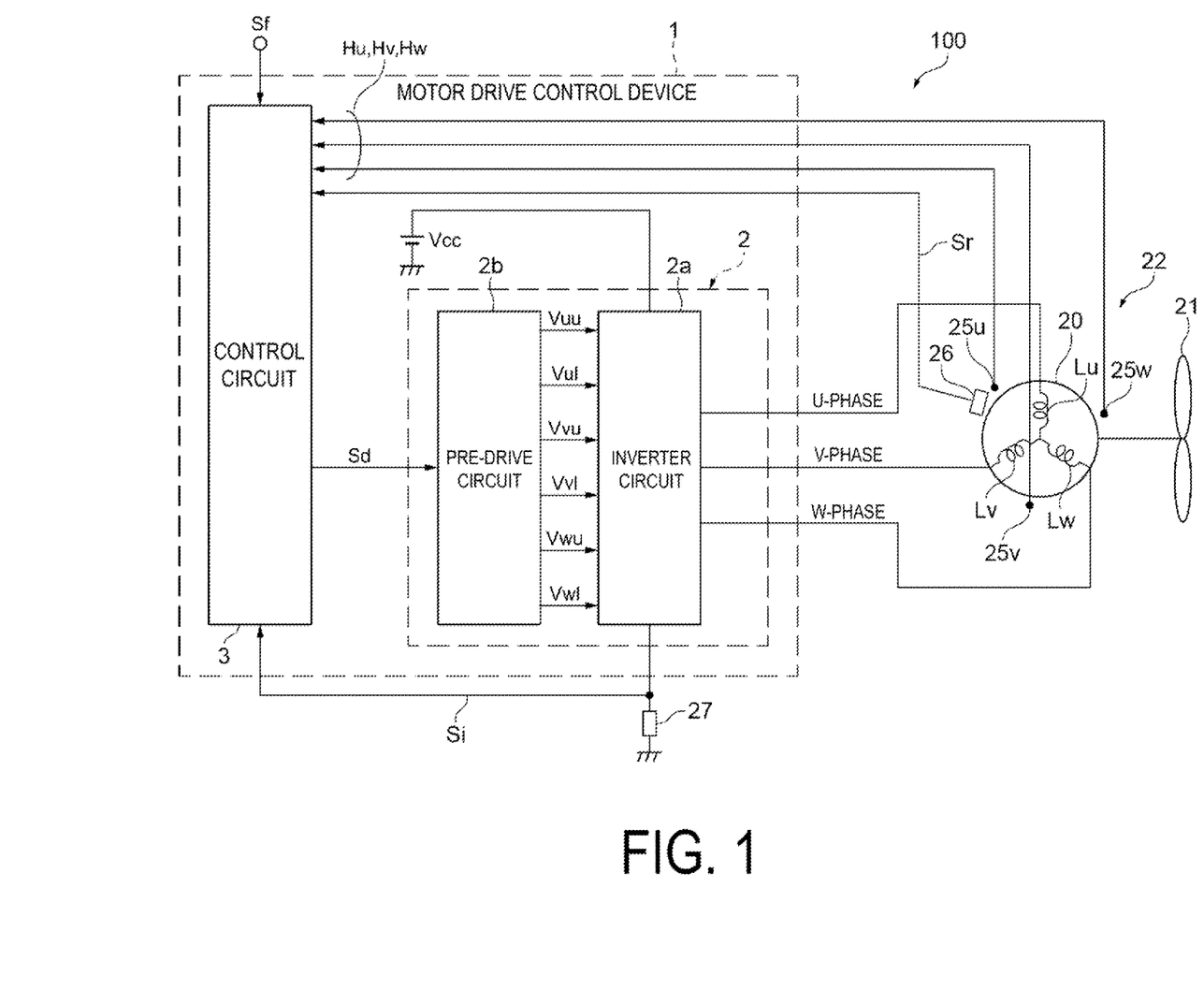
FIG. 1 is a diagram illustrating a configuration of a fan unit including a motor drive control device according to the present embodiment.

FIG. 1 is a diagram illustrating a configuration of the fan unit including the motor drive control device 1 according to the present embodiment.

The fan unit 100 illustrated in FIG. 1 is a device configured to generate an airflow by rotating an impeller (bladed wheel). The fan unit 100 can be applied to ventilation equipment (a ventilation fan) for discharging air from a room to the outside, for example.

As illustrated in FIG. 1, the fan unit 100 includes the motor 20, the impeller 21, a rotation position detector 25 configured to detect a rotation position of the motor 20, a rotation speed detector 26 configured to detect a rotation speed of the motor 20, a current detector 27 configured to detect a current flowing in the motor 20, and the motor drive control device 1 configured to drive the motor 20.

The motor 20 is a brushless motor, for example. In the present embodiment, the motor 20 is a brushless motor including coils in three phases. The motor drive control device 1 is a device used for controlling the rotation of the motor 20. For example, the motor drive control device 1 outputs a sine wave drive signal to the motor 20 and causes a drive current having a sine wave form to periodically flow to coils Lu, Lv, and Lw in the three phases of the motor 20 to rotate the motor 20.

The impeller (bladed wheel) 21 is a component configured to generate an airflow, and is configured to be rotatable by the rotation force of the motor 20. For example, a rotation shaft of the impeller 21 is coaxially coupled to an output shaft of the motor 20. In the present embodiment, the impeller 21 and the motor 20 form one fan 22, for example.

The motor drive control device 1 includes the motor drive circuit 2 and the control circuit 3. Note that not all of the constitution elements of the motor drive control device 1 are illustrated in FIG. 1, and the motor drive control device 1 may include other constitution elements, in addition to the constitution elements illustrated in FIG. 1.

The motor drive circuit 2 drives the motor 20, based on the drive control signal Sd output from the control circuit 3 described later. The motor drive circuit 2 includes an inverter circuit 2a and a pre-drive circuit 2b.

The inverter circuit 2a outputs a drive signal to the motor 20, based on an output signal output from the pre-drive circuit 2b, and causes current to flow in the coils Lu, Lv, and Lw included in the motor 20. For example, the inverter circuit 2a is configured so that a pair of series circuits each including two switch elements provided on both ends of a DC power supply Vcc are disposed for each phase (a U-phase, a V-phase, and a W-phase) of the coils Lu, Lv, and Lw. In each of the pairs of two switch elements, the terminals of each phase of the motor 20 are connected to a connection point between the switch elements.

Based on the drive control signal Sd from the control circuit 3, the pre-drive circuit 2b generates an output signal used for driving the inverter circuit 2a and outputs the generated output signal to the inverter circuit 2a.

The drive control signal Sd is a signal used for controlling the drive of the motor 20 and is a pulse width modulation (PWM) signal, for example. Specifically, the drive control signal Sd includes six types of PWM signals corresponding to each of the switch elements of the inverter circuit 2a. Specifically, the drive control signal Sd is a signal used for switching a current flowing pattern of the coils Lu, Lv, and Lw of the motor 20 determined by an on/off state of each of the switch elements constituting the inverter circuit 2a.

Based on the drive control signal Sd, the pre-drive circuit 2b generates and outputs six types of drive signals Vuu, Vul, Vvu, Vvl, Vwu, and Vwl for driving each of the switch elements of the inverter circuit 2a, for example. When these drive signals are input into the inverter circuit 2a, the switch elements constituting the inverter circuit 2a and corresponding to each of the drive signals turn on and off. Thus, power is supplied to each phase of the motor 20.

Rotation position detectors 25u, 25v, and 25w generate rotation position detection signals Hu, Hv, and Hw in accordance with the rotation of a rotor of the motor 20. The rotation position detectors 25u, 25v, and 25w are Hall elements, for example. Hereinafter, the rotation position detectors 25u, 25v, and 25w are also referred to as "Hall elements 25u, 25v, and 25w".

The three Hall elements 25u, 25v, and 25w are provided corresponding to each phase (the U-phase, the V-phase, and the W-phase) of the motor 20. For example, the Hall elements 25u, 25v, and 25w are disposed around the rotor (rotating element) of the motor 20 at substantially equal intervals from each other (for example, at an interval of 120 degree to an adjacent Hall elements).

The Hall elements 25u, 25v, and 25w each detect a magnetic pole of the rotor and output Hall signals as the rotation position detection signals Hu, Hv, and Hw. Hall signal is a voltage signal changing in accordance with the rotation of the rotor. The rotation position detection signals Hu, Hv, and Hw are input into the control circuit 3.

Note that, the control circuit 3 may be configured so that, instead of the Hall signal, another signal corresponding to the rotation position of the rotor of the motor 20 is input as the rotation position detection signal into the control circuit 3. For example, an encoder, a resolver, a motor current detection circuit, or the like may be provided, and a detection signal of the encoder, the resolver, the motor current detection circuit, or the like may be input into the control circuit 3.

The rotation speed detector 26 generates a rotation speed detection signal Sr in accordance with the rotation of the rotor of the motor 20. For example, the rotation speed detector 26 is a frequency generator (FG) pattern formed on a substrate (a printed circuit board) mounted with the motor 20. The FG pattern functioning as the rotation speed detector 26 generates a signal (an FG signal) having a period corresponding to the number of rotations of the motor 20. The FG signal output from the rotation speed detector 26 is input into the control circuit 3 as the rotation speed detection signal Sr.

Note that, in the present example, the FG pattern is employed for the rotation speed detector 26, but the rotation speed detector 26 is not limited to the FG pattern. Thus, another rotation speed detector such as an encoder and a resolver may be used, or the rotation speed may be derived on the basis of the Hall signal (the rotation position detection signals Hu, Hv, and Hw) and the derived signal may be input as the rotation speed detection signal Sr into the control circuit 3.

The current detector 27 generates a current detection signal Si corresponding to a current value of the current flowing on a DC side of the inverter circuit 2a constituting the motor drive circuit 2. For example, the current detector 27 is a current detection element disposed on a negative side (ground side) of the inverter circuit, and is a resistor (shunt resistor), for example. The current detection element functioning as the current detector 27 generates a voltage in accordance with the current flowing in the current detection element and outputs the voltage as the current detection signal Si.

Based on an air volume command signal Sf, the rotation position detection signals Hu, Hv, and Hw, and the rotation speed detection signal Sr, the control circuit 3 generates the drive control signal Sd for driving the motor 20, and supplies the drive control signal Sd to the motor drive circuit 2. Specifically, based on the rotation position detection signals Hu, Hv, and Hw and the rotation speed detection signal Sr, the control circuit 3 acquires information such as the rotation position and the rotation speed of the rotor of the motor 20 to monitor a rotation state of the motor 20, and generates the drive control signal Sd to control the drive of the motor 20 so that an air volume specified by the air volume command signal Sf is supplied from the fan 22.

Note that the rotation speed detection signal Sr may be obtained by a calculation based on the rotation position detection signals Hu, Hv, and Hw, or the rotation position detection signals Hu, Hv, and Hw may be used as the rotation speed detection signal Sr.

In the present embodiment, the control circuit 3 is achieved by a program processing device (for example, a microcontroller) including a processor such as a CPU, various types of storage devices such as a RAM and a ROM, and a peripheral circuit such as a counter (a timer), an A/D conversion circuit, a D/A conversion circuit, a clock generation circuit, and an input/output I/F circuit, for example. In the program processing device, the processor, the storage devices, and the peripheral circuit are connected with each other via a bus or a dedicated line, for example.

Note that the motor drive control device 1 may be configured to include a single integrated circuit device (IC) package containing at least a part of the control circuit 3 and at least a part of the motor drive circuit 2, or configured to include separate integrated circuit device packages each containing one of the control circuit 3 and the motor drive circuit 2.

When controlling the air volume of the fan 22 on the basis of the air volume command signal Sf, the control circuit 3 controls the air volume by constant air volume control, to generate the drive control signal Sd so that the air volume is constant, regardless of pressure loss (static pressure) caused by the length of a duct and the like in the ventilation equipment including the fan unit 100. The constant air volume control performed by the control circuit 3 will be described below.

Figure 2:
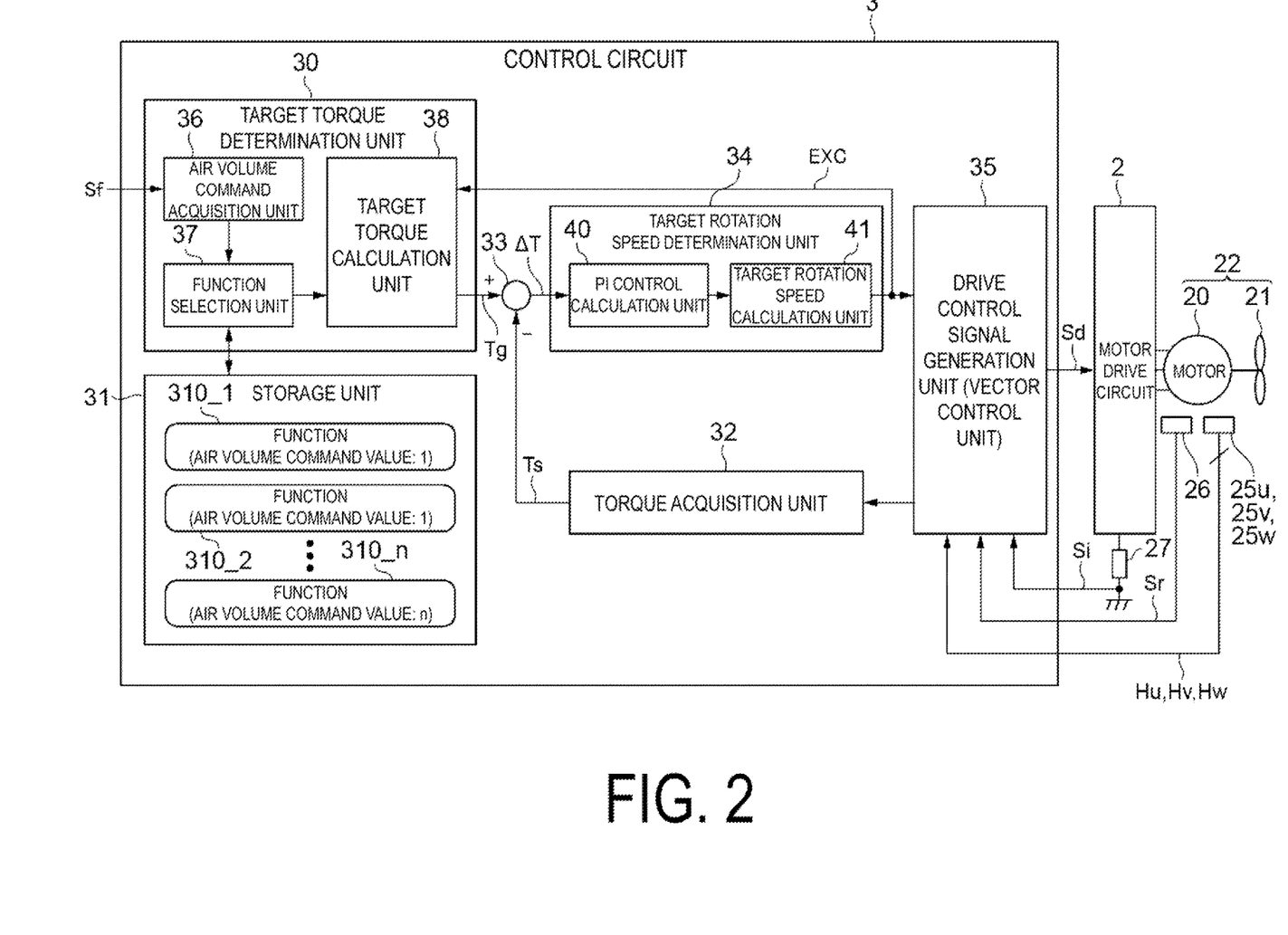
FIG. 2 is a diagram illustrating a functional block configuration of a control circuit.

FIG. 2 is a diagram illustrating a functional block configuration of the control circuit 3.

As illustrated in FIG. 2, the control circuit 3 includes the target torque determination unit 30, the storage unit 31, the torque acquisition unit 32, an error calculation unit 33, the target rotation speed determination unit 34, and the drive control signal generation unit 35 as functional blocks for implementing the constant air volume control. In a program processing device functioning as the control circuit 3, these functional blocks are achieved, for example, by a processor executing various types of calculation processes in accordance with a program stored in a memory, and controlling a peripheral circuit such as a counter and an A/D conversion circuit.

The target torque determination unit 30 is a functional unit configured to determine a target value of the torque (hereinafter, referred to as "target torque") of the motor 20 required to supply an air volume specified by the air volume command signal Sf from the fan 22. The target torque determination unit 30 uses the correspondence information 310 stored in the storage unit 31 described later, to calculate a target torque Tg from the target rotation speed EXC of the motor 20 calculated by the target rotation speed determination unit 34 described later.

The storage unit 31 is a functional unit configured to store a parameter and the like required for the constant air volume control. For example, the storage unit 31 stores data such as the correspondence information 310 and an initial value of the target rotation speed EXC provided for each air volume command value.

Here, the correspondence information 310 is data indicating a relationship between the rotation speed and the torque of the motor 20 when the fan 22 supplies a predetermined air volume.

Figure 3:
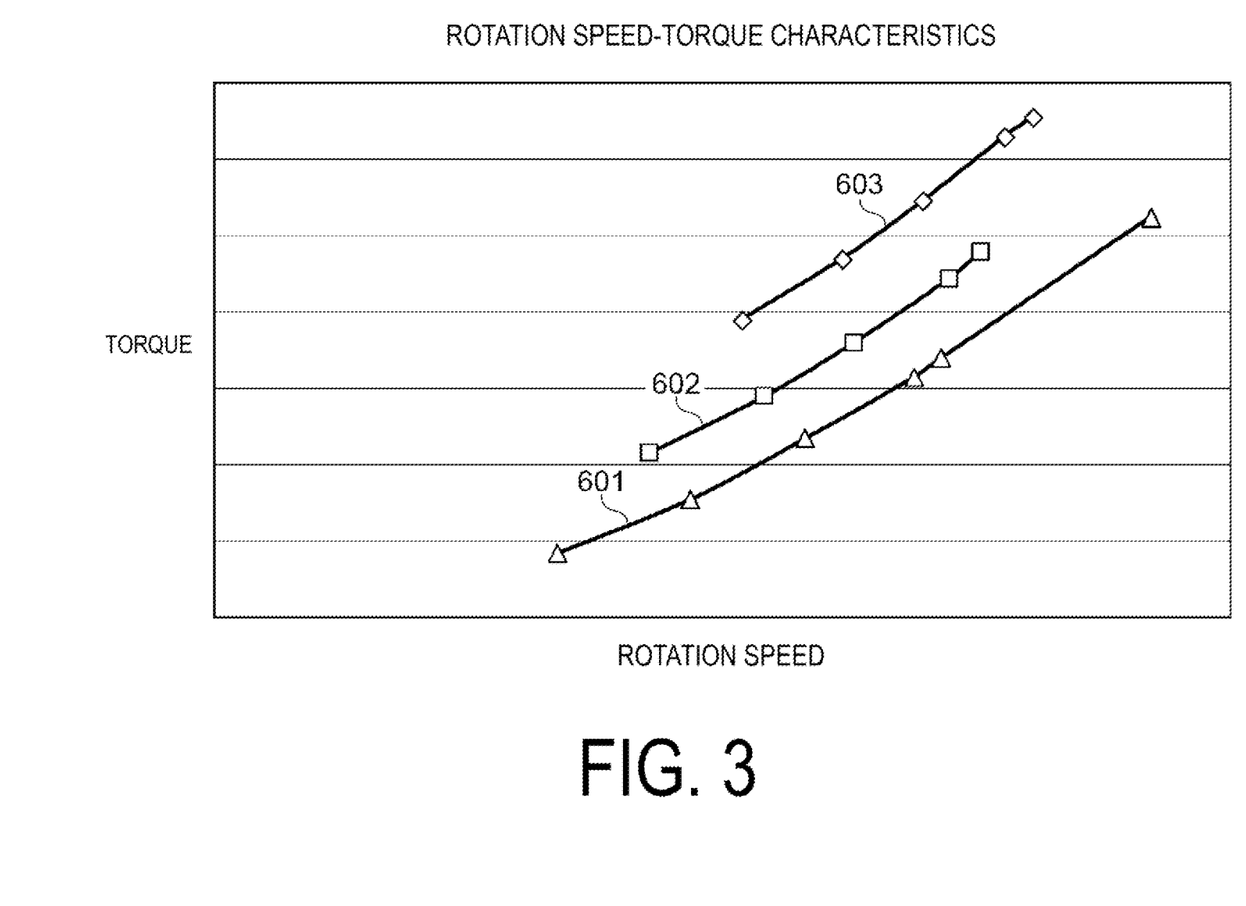
FIG. 3 is a graph showing a relationship between the rotation speed and the torque of a motor of a fan.

FIG. 3 is a graph showing the relationship between the rotation speed and the torque of the motor 20 of the fan 22.

In FIG. 3, the horizontal axis represents the rotation speed of the motor 20, and the vertical axis represents the torque of the motor 20. Furthermore, characteristics 601 to 603 are graphs drawn on the basis of actual measurement values of the rotation speed and the torque of the motor 20 when the fan 22 is operated so that the air volume of the fan 22 is maintained constant at a predetermined value, and express rotation speed-torque characteristics of the motor 20.

In FIG. 3, reference numeral 601 represents a torque characteristic with respect to the rotation speed of the motor 20 when the air volume of the fan 22 takes a first value (=F1), reference numeral 602 represents a torque characteristic with respect to the rotation speed of the motor 20 when the air volume of the fan 22 takes a second value (=F2>F1), and reference numeral 603 represents a torque characteristic with respect to the rotation speed of the motor 20 when the air volume of the fan 22 takes a third value (=F3>F2>F1).

As can be understood from FIG. 3, the rotation speed-torque characteristics of the motor 20 differ depending on the air volume of the fan 22. Therefore, if the rotation speed and the torque of the motor 20 are controlled so as to change along the characteristics 601 to 603 in accordance with the air volume required for the fan 22, it is possible to operate the fan 22 so that the required air volume is constant.

Thus, in the motor drive control device 1 according to the present embodiment, the function 310 representing the relationship between the rotation speed and the torque of the motor 20 for each air volume of the fan 22 is stored in advance in the storage unit 31, and the rotation speed and the torque of the motor 20 are adjusted by using these functions to obtain a constant air volume of the fan 22.

Specifically, the storage unit 31 stores the function 310 for each of a plurality of air volume command values specifiable in the fan 22. For example, when the air volume of the fan 22 is switchable ton (n being an integer of 2 or greater) levels, the functions 310_1 to 310_*n* representing the relationship between the rotation speed and the torque of the motor 20 are stored in the storage unit 31 for each of the n levels of air volume.

For example, the rotation speed and the torque of the motor 20 when the motor 20 is driven under different static pressure conditions so that the air volume of the fan 22 remains constant at a predetermined value are measured in advance by experiments, simulations, or the like. Next, a regression analysis using measurement values of the rotation speed and the torque is performed to calculate an approximation function (for example, a quadratic function) representing the relationship between the rotation speed and the torque, for each air volume. Subsequently, the coefficients of these approximation functions are stored in the storage unit 31 of the motor drive control device 1 as the correspondence information 310_1 to 310_*n*.

The target torque determination unit 30 uses the functions 310_1 to 310_*n* stored in the storage unit 31 to calculate the target torque Tg, based on the air volume command signal Sf and the target rotation speed EXC determined by the target rotation speed determination unit 34 described later. Specifically, as illustrated in FIG. 2, the target torque determination unit 30 includes an air volume command acquisition unit 36, a function selection unit 37, and a target torque calculation unit 38.

The air volume command acquisition unit 36 is a functional unit configured to acquire an air volume command value from the air volume command signal Sf input from the outside. For example, when a user operates an operation input unit of a ventilation fan to specify a desired air volume, the operation input unit generates the air volume command signal Sf indicating the specified air volume and outputs the air volume command signal Sf to the air volume command acquisition unit 36.

The air volume command acquisition unit 36 acquires a designated value of the air volume from the input air volume command signal Sf. For example, when the ventilation fan is settable to three air volume levels, being "weak", "medium", and "strong", and the air volume command signal Sf is a 2-bit digital signal, the air volume command acquisition unit 36 determines which of "weak", "medium", "strong", or "operation stop" is specified by the air volume command value, based on a 2-bit logical value of the air volume command signal Sf. For example, when the air volume command signal Sf is "00", the air volume command acquisition unit 36 determines that the setting is an instruction to stop the fan 22, when the air volume command signal Sf is "01", the air volume command acquisition unit 36 determines that the setting of the air volume command value is "weak", when the air volume command signal Sf is "10", the air volume command acquisition unit 36 determines that the setting of the air volume command value is "medium", and when the air volume command signal Sf is "11", the air volume command acquisition unit 36 determines that the setting of the air volume command value is "strong".

The function selection unit 37 selects any one of the functions 310_1 to 310_*n*, based on the air volume command value acquired by the air volume command acquisition unit 36. The function selection unit 37 selects, among the functions 310_1 to 310_*n*, a function corresponding to the air volume specified by the air volume command value acquired by the air volume command acquisition unit 36, and reads the function from the storage unit 31.

The target torque calculation unit 38 uses the function 310 selected by the function selection unit 37 to calculate the target torque Tg from the target rotation speed EXC determined by the target rotation speed determination unit 34. For example, the target torque calculation unit 38 calculates the torque by substituting the value of the target rotation speed EXC for the rotation speed being a variable of the function 310, and outputs the calculated torque as the target torque Tg.

The torque acquisition unit 32 is a functional unit configured to acquire a measurement value of the torque of the motor 20. Specifically, the torque acquisition unit 32 acquires the q-axis current Iq calculated in a vector control calculation process performed by the drive control signal generation unit 35 described later. Generally, it is known that the q-axis current is proportional to the torque. Therefore, the torque acquisition unit 32 uses a parameter indicating the relationship between the q-axis current and the torque to calculate the torque value Ts of the motor 20 from the q-axis current Iq. For example, the torque acquisition unit 32 calculates an average value of the q-axis current Iq for each predetermined period and multiplies the value by a predetermined coefficient, to calculate the torque value Ts. Note that the calculation process described above may not necessarily be performed with respect to the acquired value of the q-axis current, and the acquired q-axis current value may be used as the torque value Ts.

The error calculation unit 33 is a functional unit configured to calculate the difference between the target torque Tg determined by the target torque determination unit 30 and the torque value Ts being the measurement value of the torque of the motor 20 acquired by the torque acquisition unit 32. The error calculation unit 33 outputs the difference between the target torque Ts and the torque value Ts as a torque error ΔT.

The target rotation speed determination unit 34 is a functional unit configured to determine the target rotation speed EXC of the motor 20 so as to reduce the difference between the target torque Tg and the torque value Ts. As illustrated in FIG. 2, the target rotation speed determination unit 34 includes a PI control calculation unit 40 and a target rotation speed calculation unit 41. The PI control calculation unit 40 calculates, by a PI control calculation, a control amount so that the torque error ΔT is zero. Thus, the target rotation speed calculation unit 41 determines the target rotation speed EXC of the motor 20, and the target rotation speed EXC is a speed determined so that the difference between the target torque and the torque value acquired by the torque acquisition unit is reduced. The target rotation speed calculation unit 41 multiplies the control amount calculated by the PI control calculation unit 40 by a predetermined conversion coefficient to calculate the target rotation speed EXC.

Generally, in a fan, for example, when the number of rotations (rotation speed) of the motor is increased, the air resistance increases, and thus, the load (torque) increases. On the other hand, when the number of rotations of the motor is reduced, the air resistance decreases, and thus, the load decreases. Thus, in the fan, if the number of rotations of the motor is controlled, the torque error ΔT can be controlled to take a value of 0. At this time, when an output signal of the PI control calculation unit 40 is a 10-bit digital value, the output signal is an operation amount signal expressed by 0 to 1023. Therefore, the target rotation speed determination unit 34 multiplies the output signal (a digital value) of the PI control calculation unit 40, by a predetermined conversion coefficient, to convert the output signal representing the operation amount output from the PI control calculation unit 40, into a target rotation speed signal EXC.

Note that, instead of multiplying the output signal of the PI control calculation unit 40 by a predetermined conversion coefficient, the target rotation speed determination unit 34 may calculate the target rotation speed EXC from the output signal of the PI control calculation unit 40 by performing Q-formatting (fixed point) or a saturation process of upper and lower limits.

Note that, when the target rotation speed determination unit 34 and the drive control signal generation unit 35 are formed by different integrated circuit devices (ICs), the target rotation speed determination unit 34 may generate a periodic signal having a frequency corresponding to the target rotation speed EXC, for example. In this case, the periodic signal is output from an external terminal of the integrated circuit device formed with the target rotation speed determination unit 34, and input into an external terminal of the integrated circuit device formed with the drive control signal generation unit 35. The drive control signal generation unit 35 analyses the frequency of the input periodic signal to acquire information about the target rotation speed EXC.

The drive control signal generation unit 35 is a functional unit configured to generate the drive control signal Sd so that the rotation speed of the motor 20 approaches the target rotation speed EXC. For example, the drive control signal generation unit 35 generates the drive control signal Sd as a PWM signal by a vector control calculation. Note that the method of generating the drive control signal Sd is not limited to the vector control calculation, and may be a calculation using of control or the like. However, in the present embodiment, description proceeds assuming that the drive control signal generation unit 35 performs the vector control calculation.

In the vector control calculation, the drive control signal generation unit 35 calculates, based on a current flowing in the coil of each phase of the motor 20, each of the q-axis current Iq corresponding to the torque of the motor 20 and the d-axis current Id corresponding to the magnetic flux of the motor 20, determines a duty ratio such that the calculated q-axis current Iq and d-axis current Id are respectively equal to the target current values Iq_ref and Id_ref corresponding to the target rotation speed EXC, and outputs a PWM signal having the duty ratio as the drive control signal Sd. The vector control calculation by the drive control signal generation unit 35 will be described in more detail below.

Figure 4:
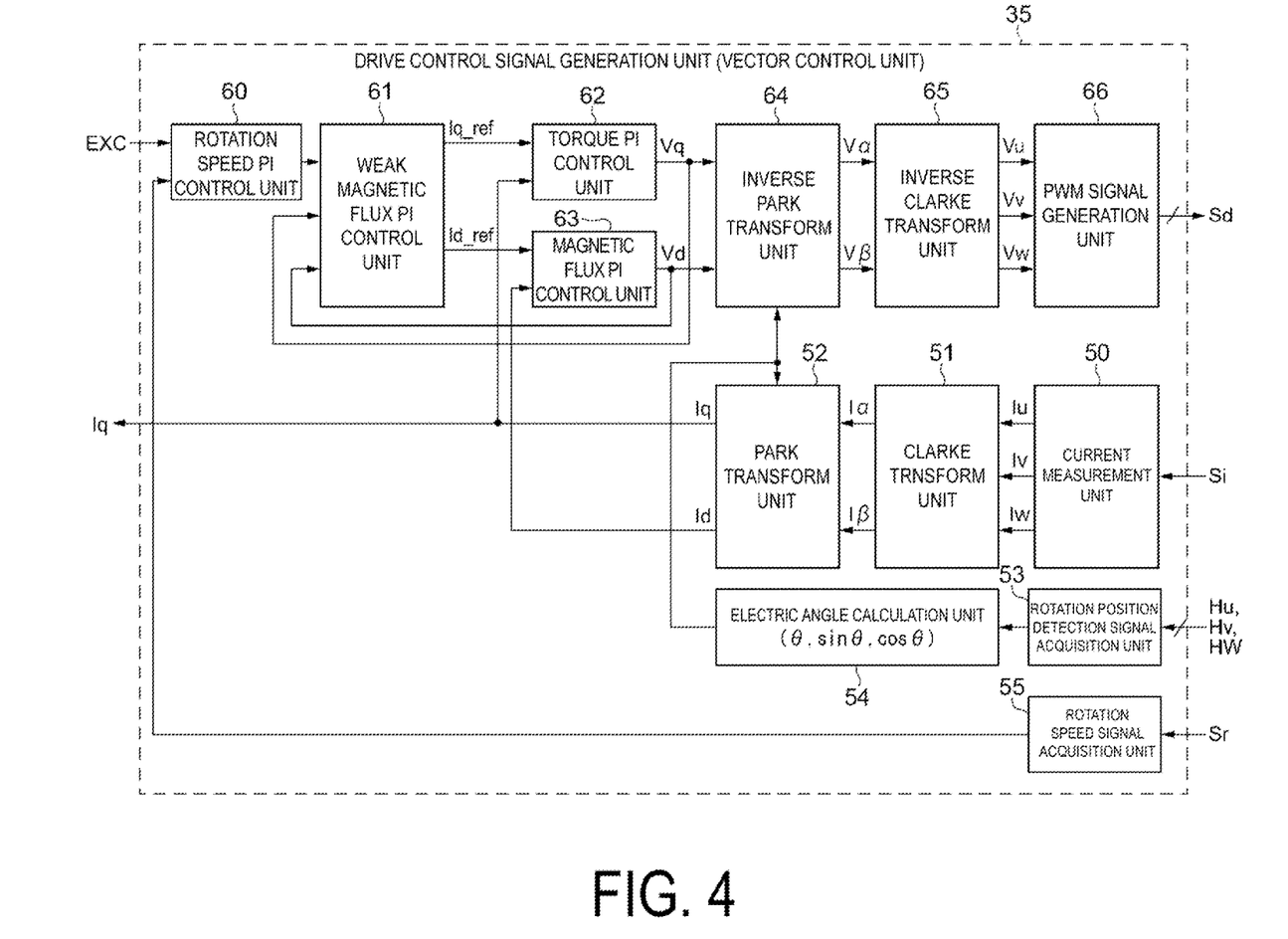
FIG. 4 is a block diagram illustrating an internal configuration of a drive control signal generation unit.

FIG. 4 is a block diagram illustrating an internal configuration of the drive control signal generation unit 35.

The drive control signal generation unit 35 includes a current measurement unit 50, a Clarke transform unit 51, a Park transform unit 52, a rotation position detection signal acquisition unit 53, an electric angle calculation unit 54, a rotation speed signal acquisition unit 55, a rotation speed PI control unit 60, a weak magnetic flux PI control unit 61, a torque PI control unit 62, a magnetic flux PI control unit 63, an inverse Park transform unit 64, an inverse Clarke transform unit 65, and a PWM signal generation unit 66, as functional blocks to function as a vector control unit.

In a program processing device constituting the control circuit 3, these functional blocks are achieved by a processor executing various types of calculation processes in accordance with a program stored in a memory, and controlling a peripheral circuit such as a counter and an A/D conversion circuit.

The current measurement unit 50 acquires the current detection signal S1 output from the current detector 27, and generates measurement values of phase currents Iu, Iv, and Iw of each phase of the motor 20, based on the acquired current detection signal Si. The Clarke transform unit 51 applies a Clarke transform to the measurement values of the phase currents Iu, Iv, and Iw generated by the current measurement unit 50, to calculate currents Iα and Iβ of a two-phase Cartesian coordinate (fixed coordinate) system (α, β). The Park transform unit 52 applies a Park transform to the currents Iα and Iβ by using an electric angle θ (sin θ and cos θ) calculated by the electric angle calculation unit 54, to calculate the q-axis current Iq and the d-axis current Id of rotation coordinates from the currents Iα and Iβ having two-phase fixed coordinates.

Here, the q-axis current Iq is a current (torque current) corresponding to the torque of the motor 20, and the d-axis current Id is an excitation current of the motor 20.

The rotation position detection signal acquisition unit 53 acquires the rotation position detection signals (Hall signals) Hu, Hv, and Hw output from the rotation position detectors 25u, 25v, and 25w. Based on the three rotation position detection signals Hu, Hv, and Hw acquired by the rotation position detection signal acquisition unit 53, the electric angle calculation unit 54 calculates a rotation angle θ of the rotor of the motor 20, and also calculates sinθ and cos θ. The rotation speed signal acquisition unit 55 acquires a rotation speed signal (FG signal) Sr output from the rotation speed detector 26, and based on the acquired rotation speed signal Sr, acquires a measurement value of the rotation speed of the motor 20.

The rotation speed PI control unit 60 performs a PI control calculation, based on the target rotation speed EXC of the motor 20 output from the target rotation speed determination unit 34 and the measurement value of the rotation speed of the motor 20 acquired by the rotation speed signal acquisition unit 55. The rotation speed PI control unit 60 calculates the difference between the target rotation speed EXC and the measurement value of the rotation speed of the motor 20, and calculates the control amount by the PI control calculation so as to reduce the difference.

Based on voltage command values Vq and Vd described later and the control amount calculated by the rotation speed PI control unit 60, the weak magnetic flux PI control unit 61 calculates, by a known calculation method, each of the q-axis current target value Iq_ref, being the target value of the torque current, and the d-axis current target value Id_ref, being the target value of the excitation current.

The torque PI control unit 62 performs the PI control calculation, based on the q-axis current target value Iq_ref calculated by the weak magnetic flux PI control unit 61 and the q-axis current Iq calculated by the Park transform unit 52. The torque PI control unit 62 calculates the difference between the q-axis current target value Iq_ref and the q-axis current Iq, and calculates, by the PI control calculation, the voltage command value Vq as a control amount for reducing the difference. The magnetic flux PI control unit 63 calculates the difference between the d-axis current target value Id_ref and the d-axis current Id, and calculates, by the PI control calculation, the voltage command value Vd as a control amount for reducing the difference.

The inverse Park transform unit 64 applies an inverse Park transform to the voltage command values Vq and Vd by using the electric angle θ (sin θ and cos θ) calculated by the electric angle calculation unit 54, to calculate voltages Vα and Vβ having two-phase fixed coordinates, from the rotation coordinates. The inverse Clarke transform unit 65 calculates phase voltages Vu, Vv, and Vw of the three phases by applying an inverse Clarke transform to the voltages Vα and Vβ having two-phase fixed coordinates.

Based on the phase voltages Vu, Vv, and Vw of each phase calculated by the inverse Clarke transform unit 65, the PWM signal generation unit 66 calculates duty ratios (setting values of the duty ratio of each phase) Udu, Vdu, and Wdu used for generating PWM signals of the three phases. The PWM signal generation unit 66 generates the PWM signals of the three phases having the calculated duty ratio of each phase and outputs the generated PWM signals as the drive control signals Sd.

Next, a process flow of the constant air volume control by the motor drive control device 1 according to the present embodiment will be described.

Figure 5:
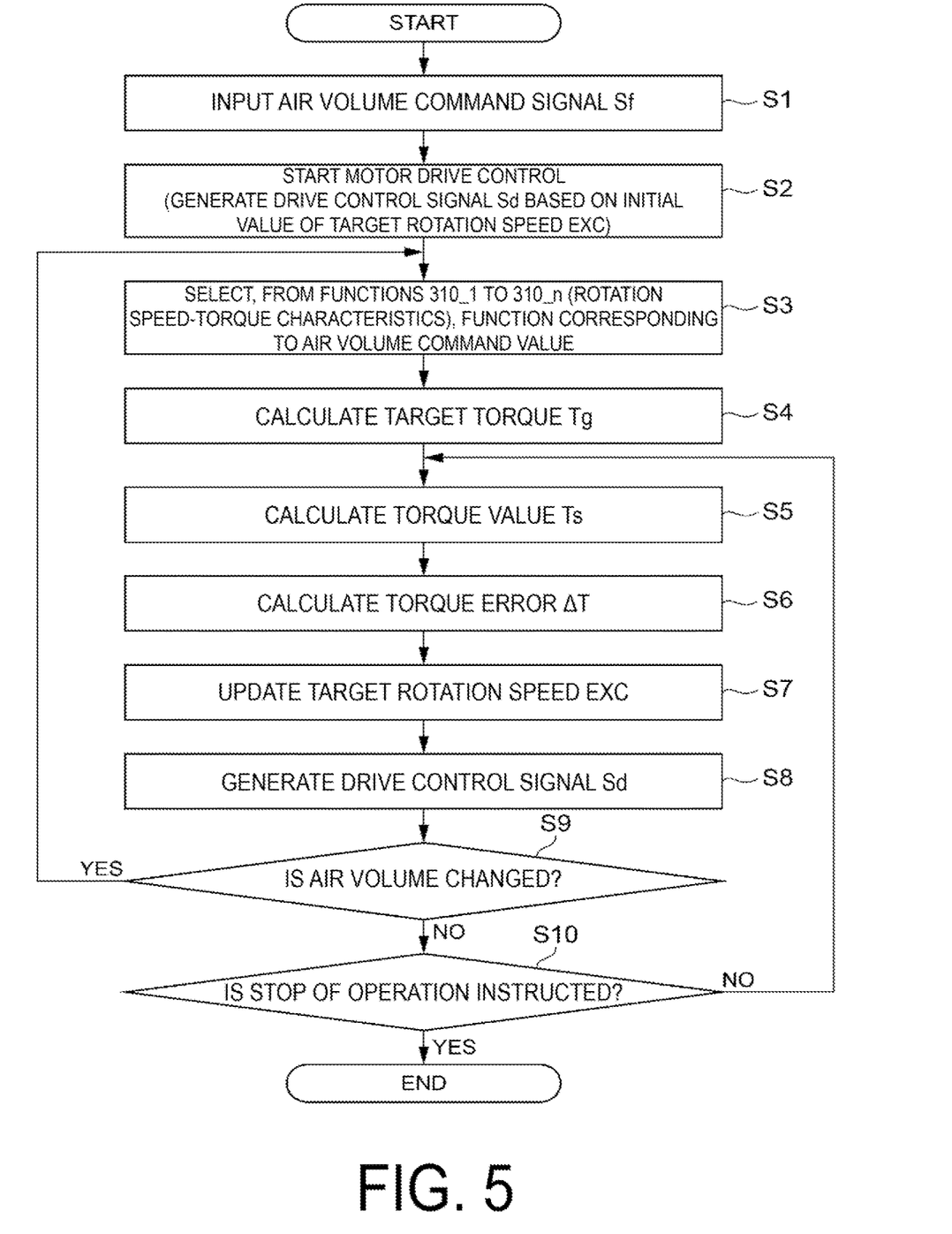
FIG. 5 is a flowchart of a process flow of constant air volume control by the motor drive control device according to the present embodiment.

FIG. 5 is a flowchart illustrating the process flow of the constant air volume control by the motor drive control device 1 according to the present embodiment.

For example, it is assumed that a user operates the operation input unit of the ventilation fan to cause the ventilation fan to operate at a predetermined air volume when the operation of the ventilation fan is stopped. In this case, the operation input unit of the ventilation fan inputs, in response to the operation of the user, the air volume command signal Sf including the designated value of the air volume, into the motor drive control device 1 (step S1).

When the air volume command signal Sf is input into the motor drive control device 1, the motor drive control device 1 starts to control the drive of the motor 20 (step S2). Specifically, in the motor drive control device 1, for example, the target torque determination unit 30 reads, from the storage unit 31, an initial value of the target rotation speed EXC corresponding to the air volume command value specified by the air volume command signal Sf and sets the initial value of the target rotation speed EXC in the target rotation speed determination unit 34, and the target rotation speed determination unit 34 inputs the set initial value of the target rotation speed EXC to the drive control signal generation unit 35. The drive control signal generation unit 35 performs the above-described vector control calculation, based on the initial value of the target rotation speed EXC input from the target rotation speed determination unit 34 to generate the drive control signal Sd, and inputs the drive control signal Sd into the motor drive circuit 2. Thus, the motor 20 starts to rotate.

Subsequently, the target torque determination unit 30 selects the function 310 corresponding to the air volume command value specified in step S1 (step S3). Specifically, as described above, the function selection unit 37 reads, from the storage unit 31, the function 310 corresponding to the air volume command value specified by the air volume command signal Sf and provides the function 310 to the target torque calculation unit 38.

The target torque calculation unit 38 uses the function 310 read in step S3 to calculate, by the procedure described above, the target torque Tg from the target rotation speed EXC calculated by the target rotation speed determination unit 34 (step S4).

Furthermore, the torque acquisition unit 32 in the motor drive control device 1 calculates the torque of the motor 20 (step S5). Specifically, as described above, the torque acquisition unit 32 acquires the q-axis current Iq calculated by the drive control signal generation unit 35 by the vector control calculation, and calculates the torque value Ts (the measurement value of the torque) of the motor 20, based on the q-axis current Iq.

Subsequently, the error calculation unit 33 in the motor drive control device 1 calculates the torque error ΔT, being the difference between the target torque Tg calculated in step S4 and the torque value Ts calculated in step S5 (step S6).

Subsequently, the target rotation speed determination unit 34 in the motor drive control device 1 calculates, from the torque error ΔT calculated in step S6, the target rotation speed EXC by the procedure described above (step S7). Thus, the value of the target rotation speed EXC is updated, based on the torque error ΔT reflecting the actual drive state of the motor 20.

Subsequently, the drive control signal generation unit 35 in the motor drive control device 1 determines the duty ratio of the PWM signal being the drive control signal Sd, based on the target rotation speed EXC updated in step S7, generates the drive control signal Sd having the determined duty ratio, and provides the drive control signal Sd to the motor drive circuit 2 (step S8).

Thus, the rotation speed of the motor 20 is adjusted to take the value of the target rotation speed EXC, and the torque of the motor 20 is adjusted to take the value of the target torque Tg. In other words, the rotation speed and the torque of the motor 20 are controlled so as to follow the rotation speed-torque characteristics shown in FIG. 3. Therefore, the fan 22 operates so as to supply the constant air volume specified in step S1.

Subsequently, the motor drive control device 1 determines whether an air volume designation value is changed (step S9). When the air volume command value is changed by the new air volume command signal Sf (Yes in step S9), the motor drive control device 1 proceeds to step S3 and executes the above-mentioned processes (S3 to S8). That is, the motor drive control device 1 reads the function 310 according to the new air volume command value, updates the target torque Tg, generates the drive control signal Sd, and controls the rotation of the motor 20, based on the newly calculated target rotation speed EXC. Thus, the fan 22 operates so as to supply the newly specified constant air volume.

On the other hand, when the air volume command value is not changed (No in step S9), the motor drive control device 1 determines whether a stop of the operation of the fan 22 is instructed (step S10). When the stop of the operation of the fan 22 is not instructed by the air volume command signal Sf (No in step S10), the motor drive control device 1 proceeds to step S5 and executes the above-mentioned processes (S5 to S8) to generate the drive control signal Sd so that the fan 22 continues to supply the air volume specified in step S1.

On the other hand, when the stop of the operation of the fan 22 is instructed (Yes in step S10), the motor drive control device 1 stops the rotation of the motor 20 by the drive control signal Sd. For example, the target torque determination unit 30 (for example, the air volume command acquisition unit 36) instructs the target rotation speed determination unit 34 (for example, the target rotation speed calculation unit 41) to set the target rotation speed EXC to zero. Therefore, the rotation of the motor 20 stops, and the fan 22 is stopped.

As described above, in the motor drive control device 1 according to the present embodiment, the storage unit 31 stores in advance the correspondence information (rotation speed-torque characteristics) 310_1 to 310_n indicating the relationship between the rotation speed and the torque of the motor 20 when the fan 22 supplies a predetermined air volume. The motor drive control device 1 calculates the target torque Tg from the rotation speed of the motor 20, by using the correspondence information 310 according to the specified air volume command value. The motor drive control device 1 determines the target rotation speed EXC of the motor so that the difference between the calculated target torque and the measured torque value of the motor 20 is reduced, and generates, based on the target rotation speed EXC, the drive control signal Sd to drive the motor 20.

Therefore, the motor drive control device 1 determines the target rotation speed EXC of the motor 20 according to the rotation speed-torque characteristic of the motor 20 associated with the specified air volume and thus, even when the static pressure of the fan 22, i.e., the torque of the motor 20, changes, the motor drive control device 1 can set the appropriate target rotation speed EXC according to the torque, and allows the motor 20 to rotate with the target rotation speed EXC. Thus, it is possible to operate the fan 22 so that the fan 22 supplies a specified constant air volume.

Furthermore, in the motor drive control device 1, the rotation speed-torque characteristic of the motor 20 associated with a predetermined air volume is stored in advance in the storage unit 31 as the correspondence information 310, and the motor drive control device 1 uses the correspondence information 310 to calculate the target torque from the target rotation speed of the motor, and thus, no complicated calculation is required to calculate the target torque. Therefore, it is possible to reduce the processing load of the microcontroller and the like constituting the control circuit 3.

Thus, according to the motor drive control device 1 according to the present embodiment, the air volume of a fan can be controlled so that the air volume is constant, by a simple configuration and calculation. In other words, it is possible to control the air volume of the fan so that the air volume is constant, by using a cheaper microcontroller instead of an expensive microcontroller capable of executing complicated calculations at high speed.

Furthermore, in the motor drive control device 1, the correspondence information 310 includes a function expressing the relationship between the rotation speed and the torque of the motor 20, and the storage unit 31 stores the functions 310_1 to 310_n for each of command values for a plurality of air volumes specifiable in the fan 22.

Therefore, even when the fan 22 includes a plurality of air volume designation values, a function of the rotation speed-torque characteristics appropriate for the specified air volume is selected from the functions 310_1 to 310_n, and thus it is possible to control the motor 20 so that the air volume of the fan is constant at any air volume command value.

Furthermore, the motor drive control device 1 generates the drive control signal Sd from the target rotation speed EXC by a so-called vector control calculation. Specifically, the motor drive control device 1 calculates, based on the current flowing in the coil of each phase of the motor 20, each of the q-axis current corresponding to the torque of the motor 20 and the d-axis current corresponding to the magnetic flux of the motor 20, and generates the drive control signal Sd such that the calculated q-axis current and d-axis current are respectively equal to the target current values Iq_ref and Id_ref corresponding to the target rotation speed EXC.

Therefore, compared with the conventional sine wave drive control, a coil current having an undistorted, clean sine waveform can be generated, and thus, it is possible to drive the motor with low vibration and low noise.

Furthermore, the motor drive control device 1 measures the torque value Ts of the motor 20, based on the q-axis current Iq calculated in the vector control calculation described above.

Therefore, the torque acquisition unit 32 does not need to perform a complicated calculation process in order to calculate the torque value Ts of the motor 20, and thus, it is possible to control the air volume of the fan so that the air volume is constant by a simpler and cheaper configuration. For example, it is assumed that the drive control signal generation unit (vector control unit) 35 in the motor drive control device 1 is implemented by an existing integrated circuit device (IC) for vector control calculation, and the target torque determination unit 30, the storage unit 31, the torque acquisition unit 32, and the target rotation speed determination unit 34 in the motor drive control device 1 are implemented by an integrated circuit device different from the integrated circuit device for vector control calculation mentioned above.

In this case, the integrated circuit device used for implementing the target torque determination unit 30, the storage unit 31, the torque acquisition unit 32, and the target rotation speed determination unit 34 does not need to perform a complicated calculation such as vector control in order to calculate the torque value Ts. Therefore, an inexpensive microcontroller having limited functions can be employed for this integrated circuit device.

Expansion of Embodiment

The invention contrived by the present inventors has been described in detail above with reference to the embodiments. However, the present invention is not limited to the embodiments, and of course, various modifications can be made without departing from the gist of the present invention.

For example, in the embodiment described above, the control circuit 3 is not limited to the circuit configuration described above. Various circuit configurations configured to meet the object of the present invention can be applied to the control circuit 3.

The flowchart described above is a specific example and the process flow is not limited to this flowchart. For example, another process may be inserted between each of the steps, or processes may be performed in parallel.

The number of phases of the motor driven by the motor drive control device according to the embodiment described above is not limited to three phases. Furthermore, the number of Hall elements is not limited to three.

The method of detecting the rotation speed of the motor is not particularly limited. For example, the rotation speed may be detected by using the counter electromotive force of the motor, instead of using the Hall element.

REFERENCE SIGNS LIST

1 Motor drive control device, 2 Motor drive circuit, 2a Inverter circuit, 2b Pre-drive circuit, 3 Control circuit, 20 Motor, 21 Impeller (bladed wheel), 22 Fan, 25, 25u, 25v, 25w Rotation position detector (Hall element), 26 Rotation speed detector, 27 Current detector, 30 Target torque determination unit, 31 Storage unit, 32 Torque acquisition unit, 33 Error calculation unit, 34 Target rotation speed determination unit, 35 Drive control signal generation unit (vector control unit), 35 Drive control signal generation unit, 36 Air volume command acquisition unit, 37 Function selection unit, 38 Target torque calculation unit, 40 PI control calculation unit, 41 Target rotation speed calculation unit, 50 Current measurement unit, 51 Clarke transform unit, 52 Park transform unit, 53 Rotation position detection signal acquisition unit, 54 Electric angle calculation unit, 55 Rotation speed signal acquisition unit, 60 Rotation speed PI control unit, 61 Magnetic flux PI control unit, 62 Torque PI control unit, 63 Magnetic flux PI control unit, 64 Inverse Park transform unit, 65 Inverse Clarke transform unit, 66 PWM signal generation unit, 100 Fan unit, 310, 310_1 to 310_n Correspondence information (function), EXC Target rotation speed, Id d-axis current, Id_ref d-axis current target value, Iq q-axis current, Iq_ref q-axis current target value, Sd Drive control signal, Sf Air volume command signal, Si Current detection signal, Sr Rotation speed signal (FG signal), Tg Target torque, Ts Torque value, ΔT Torque Error

What is claimed is:

1. A motor drive control device, comprising:
a control circuit configured to output a drive control signal for controlling drive of a motor of a fan; and
a motor drive circuit configured to drive the motor, based on the drive control signal output from the control circuit,
wherein the control circuit includes
a storage unit configured to store correspondence information indicating a relationship between a rotation speed variable and a torque variable of the motor when the fan supplies a predetermined air volume,
a target torque determination unit configured to determine a target torque from a target rotation speed of the motor by using the correspondence information corresponding to a predetermined air volume,
a torque acquisition unit configured to acquire a measured torque value of the motor,
an error calculation unit configured to calculate a difference between the target torque determined by the target torque determination unit and the measured torque value acquired by the torque acquisition unit and to output the difference as a torque error,
a target rotation speed determination unit configured to update the target rotation speed of the motor so that the torque error is zero, and
a drive control signal generation unit configured to generate the drive control signal so that a measured rotation speed of the motor approaches the updated target rotation speed,
wherein the target torque determination unit includes
an air volume command acquisition unit configured to acquire a designated value of the predetermined air volume from an input air volume command signal,
wherein the correspondence information includes a plurality of functions, each expressing a relationship between the rotation speed variable and the torque variable of the motor based on the designated value of the predetermined air volume,
a function selection unit configured to select a function from the plurality of functions corresponding to the designated value of the predetermined air volume specified by the air volume command value acquired by the air volume command acquisition unit, the function stored in the storage unit, and the function selection unit further configured to read the function from the storage unit,
a target torque calculation unit is configured to calculate the target torque by substituting the target rotation speed for the rotation speed variable, and to output the calculated torque as the target torque,
and the storage unit stores each of the functions for each of the designated values of the predetermined air volumes.

2. The motor drive control device according to claim 1, wherein
the target rotation speed determination unit is configured to perform a PI control calculation to reduce the difference between the target torque and a measured torque value and multiply a control amount obtained from the PI control calculation by a predetermined coefficient to calculate the target rotation speed.

3. A fan unit, comprising:
the motor drive control device according to claim 1;
the motor configured to be driven by the motor drive control device; and
an impeller configured to be rotatable by a rotation force of the motor.

4. The motor drive control device according to claim 1, wherein
the motor includes coils in three phases,
the drive control signal generation unit is configured to calculate, based on a current flowing in the coil of each phase of the motor, each of a q-axis current corresponding to the torque of the motor and a d-axis current corresponding to a magnetic flux of the motor, determine a duty ratio such that the calculated q-axis current and the calculated d-axis current are respectively equal to target current values corresponding to the target rotation speed, and output a PWM signal having the duty ratio, as the drive control signal, and the torque acquisition unit configured to acquire the measured torque value, based on the q-axis current calculated by the drive control signal generation unit.

* * * * *